(12) United States Patent
Yaguchi

(10) Patent No.: US 12,512,128 B2
(45) Date of Patent: Dec. 30, 2025

(54) MAGNETIC DISK DEVICE HAVING SPINDLE MOTOR

(71) Applicants: Kabushiki Kaisha Toshiba, Tokyo (JP); Toshiba Electronic Devices & Storage Corporation, Tokyo (JP)

(72) Inventor: Tomoki Yaguchi, Kawasaki Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 24 days.

(21) Appl. No.: 18/435,302

(22) Filed: Feb. 7, 2024

(65) Prior Publication Data

US 2025/0104740 A1 Mar. 27, 2025

(30) Foreign Application Priority Data

Sep. 27, 2023 (JP) ................. 2023-164187

(51) Int. Cl.
*G11B 19/20* (2006.01)
*G11B 5/54* (2006.01)
*G11B 5/82* (2006.01)
*G11B 33/04* (2006.01)

(52) U.S. Cl.
CPC .............. *G11B 33/045* (2013.01); *G11B 5/54* (2013.01); *G11B 5/82* (2013.01); *G11B 19/209* (2013.01)

(58) Field of Classification Search
None
See application file for complete search history.

(56) References Cited

U.S. PATENT DOCUMENTS

| | | | | | |
|---|---|---|---|---|---|
| 4,777,549 | A | * | 10/1988 | Dushkes | G11B 33/1446 310/90 |
| 5,328,270 | A | * | 7/1994 | Crawford | G11B 19/2009 384/100 |
| 5,328,272 | A | * | 7/1994 | Ainslie | G11B 25/043 384/115 |
| 5,479,304 | A | | 12/1995 | Morita | |
| 5,485,331 | A | * | 1/1996 | Dunfield | H02K 11/40 360/99.15 |

(Continued)

FOREIGN PATENT DOCUMENTS

| | | | | | |
|---|---|---|---|---|---|
| EP | 0760510 | A1 | * | 3/1997 | ........... G11B 33/121 |
| JP | H05225769 | A | * | 9/1993 | ............. G11B 33/12 |

(Continued)

*Primary Examiner* — William J Klimowicz
(74) *Attorney, Agent, or Firm* — Kim & Stewart LLP

(57) ABSTRACT

A magnetic disk device according to one embodiment includes a base, five or more magnetic disks in the base, a head actuator, and a spindle motor. The base has a bottom wall having a second thickness and a side wall. The spindle motor includes a sleeve with a first hole, fixed to the bottom wall, a shaft inserted in the first hole rotatably, and a hub rotatable integrally with the shaft. The hub includes a first part, a second part extending from a lowermost surface of the first part in a first direction being from the magnetic disks toward the bottom wall, and a third part having a first thickness and extending from a lowermost surface of the second part in a second direction orthogonal to the first direction. A value obtained by dividing the second thickness by the first thickness is greater than or equal to 1.89.

9 Claims, 2 Drawing Sheets

(56) References Cited

U.S. PATENT DOCUMENTS

| | | | |
|---|---|---|---|
| 8,842,386 B1 * | 9/2014 | Hirasawa | H02K 5/04 |
| | | | 360/99.16 |
| 8,848,312 B2 | 9/2014 | Watanabe et al. | |
| 2002/0047396 A1 * | 4/2002 | Saichi | F16C 17/10 |
| | | | 310/90 |
| 2005/0220380 A1 * | 10/2005 | Shindo | F16C 33/107 |
| | | | 384/107 |
| 2021/0272603 A1 * | 9/2021 | Uehara | G11B 33/1446 |
| 2022/0399041 A1 * | 12/2022 | Uehara | G11B 21/12 |
| 2023/0298624 A1 * | 9/2023 | Okamoto | G11B 25/043 |
| | | | 360/78.04 |
| 2024/0339131 A1 * | 10/2024 | Suzuki | G11B 33/12 |

FOREIGN PATENT DOCUMENTS

| | | | | |
|---|---|---|---|---|
| JP | 2004-166439 A | | 6/2004 | |
| JP | 2022190510 A | * | 12/2022 | G11B 21/12 |

* cited by examiner

MAGNETIC DISK DEVICE HAVING SPINDLE MOTOR

CROSS-REFERENCE TO RELATED APPLICATIONS

This application is based upon and claims the benefit of priority from Japanese Patent Application No. 2023-164187, filed on Sep. 27, 2023; the entire contents of which are incorporated herein by reference.

FIELD

Embodiments described herein relate generally to a magnetic disk device.

BACKGROUND

Hard disk drives (HDD) are used for recording and storing data and typically include magnetic disks, a head assembly for data reading and writing, and a spindle motor that rotates magnetic disks at a high speed.

In order to achieve resistance to external impact, such an HDD is designed to have a base of a large thickness in consideration of vibration characteristics. Due to recent progress of higher HDD capacity, there are design constraints on the height dimension, which may make it difficult to obtain a disk device resistant and invulnerable to external impact, using a conventional shaft-rotating spindle motor.

DETAILED DESCRIPTION

Figure 1:
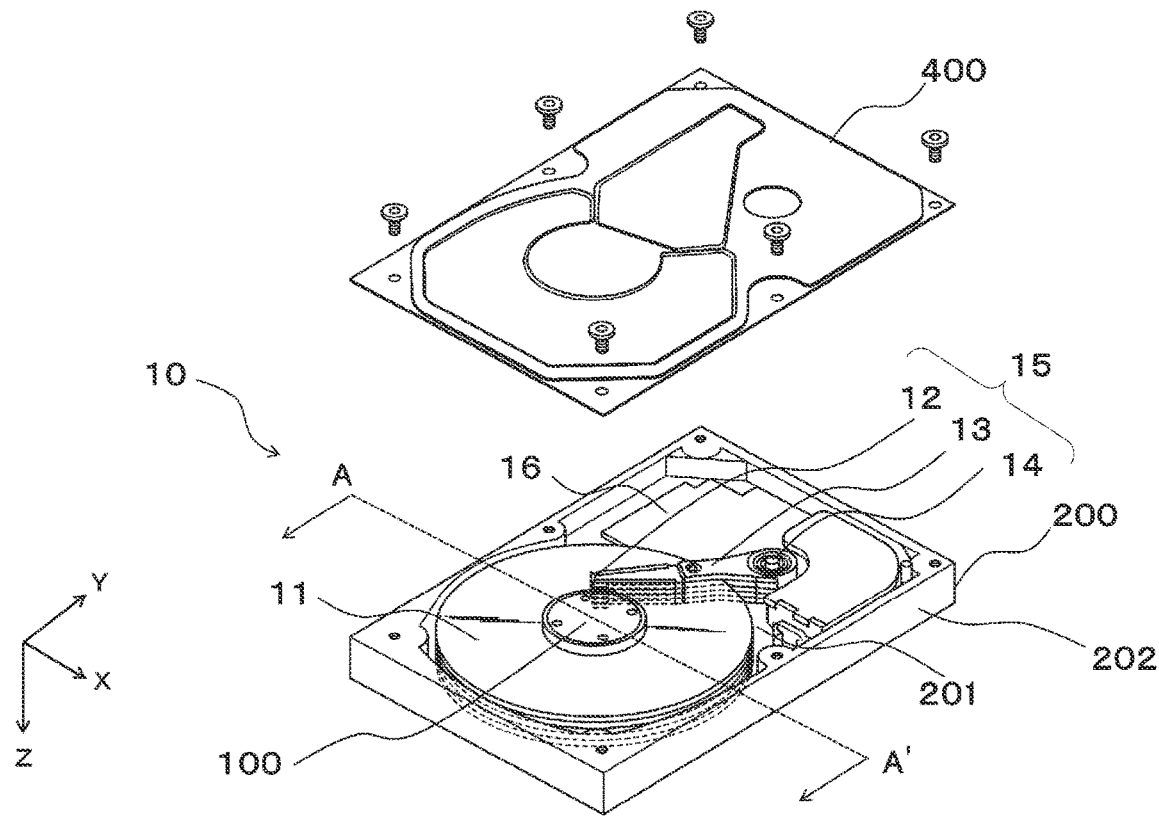
FIG. 1 is an exemplary perspective view of an HDD according to a first embodiment.

A magnetic disk device according to one embodiment includes a base, magnetic disks, a head actuator, and a spindle motor. The base has a bottom wall having a second thickness and a side wall erected along a periphery of the bottom wall. Five or more magnetic disks are provided in the base, and the head actuator has a magnetic head supported in a freely movable manner.

The spindle motor includes a sleeve with a first hole fixed to the bottom wall, a shaft inserted in the first hole in a freely rotatable state, and a hub that is freely rotatable together with the shaft. The hub includes a first part, a second part, and a third part. The first part is provided with a shaft opening through which the upper end of the shaft is inserted. The second part extends from the outer periphery of a lowermost surface of the first part in a first direction being from the magnetic disks toward the bottom wall. The third part extends from a lowermost surface of the second part in a second direction orthogonal to the first direction, and faces the bottom wall. The third part has a first thickness. A value obtained by dividing the second thickness by the first thickness is greater than or equal to 1.89.

A magnetic disk device according to another embodiment includes: a base that includes a bottom wall and a side wall erected along a periphery of the bottom wall; a top cover fixed to the side wall; five or more magnetic disks provided in the base; a head actuator that includes a magnetic head, the head actuator supporting the magnetic head in a freely movable manner; and a spindle motor of a shaft-rotating type, the spindle motor supporting the magnetic disks in a freely rotatable manner.

Hereinafter, embodiments of the present invention will be described with reference to the drawings. In this description, common parts are denoted by common symbols throughout the drawings. The dimensional ratios in the drawings are not limited to the illustrated ratios. Note that the present embodiment does not limit the present invention.

First Embodiment

Figure 2:
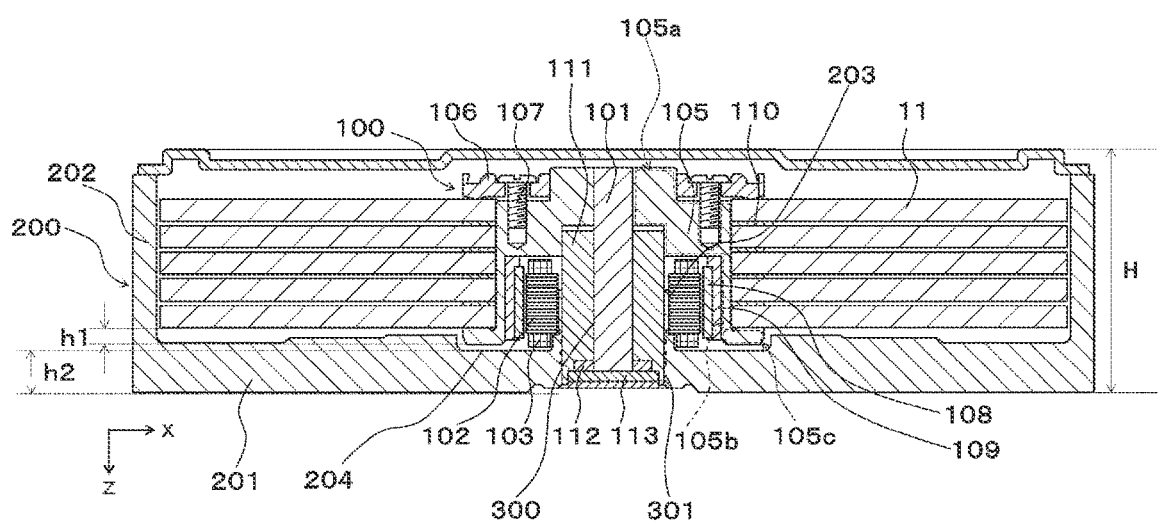
FIG. 2 is an exemplary diagram illustrating a cross-sectional view of the HDD taken along line A-A' illustrated in FIG. 1.

A hard disk drive (HDD) according to a first embodiment will be described in detail as an example of the magnetic disk device. FIG. 1 is a perspective view of the HDD according to a first embodiment, and FIG. 2 is a cross-sectional view taken along line A-A'.

Structure of HDD

The HDD according to the first embodiment will be described with reference to FIG. 1. FIG. 1 is an exemplary perspective view of the HDD according to the first embodiment.

As illustrated in FIG. 1, the HDD includes a housing 10 having a rectangular box-shaped base 200 with a top opened, and a top cover 400. The base 200 has a rectangular bottom wall 201 and a side wall 202 erected along the periphery of the bottom wall 201, which are integrally molded. The top cover 400 is joined and sealed with the base 200 using fasteners such as screws. The top cover 400 and the base 200 may be sealed using an adhesive or a fitting mechanism, in addition to the screws. The base 200 and the top cover 400 are made of a material such as aluminum, iron, or the like.

The base 200 accommodates magnetic disks 11 that magnetically record and store data, a spindle motor 100, and a head actuator 15. The spindle motor 100 supports the magnetic disks 11 in a freely rotatable manner. The head actuator 15 supports, in a freely movable manner, magnetic heads 12 that move on the surfaces of the magnetic disks 11 to detect and record changes in magnetic patterns. The head actuator 15 further includes a carriage 13 that supports the magnetic heads 12, and a voice coil motor 14 for use in position control of the carriage 13. A printed circuit board (not illustrated) is attached to the outer surface of the bottom wall 201 of the base 200 with screws, allowing the printed circuit board to control the operations of the spindle motor 100, the voice coil motor 14, and the magnetic heads 12 via a board unit 16.

The device height of the entire HDD, i.e., the height (thickness) H of the housing 10 corresponds to the distance from the lowermost surface of the bottom wall 201 to the uppermost surface of the top cover 400 and is set to 26.1 mm at a maximum in accordance with the HDD standards. Five magnetic disks 11 are mounted on the spindle motor 100 via spacers 110 as described later. The number of magnetic disks 11 to be mounted may be five or more. Each of the magnetic disks 11 has, for example, a diameter of 96 mm; however, the diameter may be, for example, 97 mm or more other than 96 mm.

A direction from the magnetic disks 11 toward the bottom wall 201 is defined as a Z direction (first direction), a direction along a longitudinal direction of the HDD in a plane perpendicular to the Z direction is defined as a Y direction (second direction), and a direction perpendicular to the Z direction and the Y direction is defined as an X direction (third direction). Further, for the sake of description, a direction from the bottom wall 201 toward the top cover 400 is referred to as "upper", and the opposite direction is referred to as "lower".

Structure of Spindle Motor 100

FIG. 2 is an exemplary cross-sectional view of the HDD taken along line A-A' illustrated in FIG. 1. As illustrated in FIG. 2, the spindle motor 100 of the first embodiment has a shaft-rotating structure including a stator 102 and a non-rotational coil 103, a shaft 101 serving as a rotation axis, and a hub 105 that rotates integrally with the shaft 101.

The shaft 101 is erected substantially perpendicularly on a thrust bush 113 as described later. The shaft 101 is inserted into a first hole 300 in a sleeve 111 in a freely rotatable state and is supported by a bearing (not illustrated). The sleeve 111 is secured in a second hole 301 in the bottom wall 201. In addition, a hydrodynamic bearing using a fluid pressure of a lubricating fluid, a ball bearing, or a cable roller bearing using a conical roller may be disposed between both the shaft 101 and the sleeve 111, for example. The first hole 300 and the second hole 301 having other parts or components inserted thereinto in a finished product are also expressed as holes.

Meanwhile, in a shaft-fixed spindle motor, the shaft 101 is fixed to the bottom wall 201 and attached to the top cover 400 with screws. The shaft-fixed structure is different from the shaft-rotating structure in that the shaft 101 does not rotate but the hub 105 rotates around the shaft 101.

The second hole 301 of the bottom wall 201 forms a cylindrical unit 203 extending in the Z direction. The stator 102 is fixed to the outer periphery of the cylindrical unit 203. The stator 102 is made of, for example, a magnetic material such as an electromagnetic steel sheet and includes a slit for winding the coil 103.

The hub 105 being a rotational part of the spindle motor 100 includes a first part 105a, a second part 105b, and a third part 105c, which are integrated. In FIG. 2, the first part 105a and the third part 105c are indicated by the broken line, and the second part 105b is indicated by the one-dot chain line. The first part 105a is provided with a shaft opening into which the upper end of the shaft 101 is inserted. The shaft opening in the first part 105a with the shaft 101 inserted in a finished product is also expressed as a shaft opening. The second part 105b extends in the Z direction in a cylindrical form from the outer periphery of the lowermost surface of the first part 105a. The third part 105c extends from the lowermost surface of the second part 105b toward the side wall 202 on an X-Y plane.

A cylindrical yoke 109 is fixed to the inner curved surface of the second part 105b. Similarly, a cylindrical magnet 108 is fixed to the yoke 109. The yoke 109 is made of a magnetic material and holds the magnet 108 to allow the magnet 108 to stably rotate. Moreover, the magnet 108 is disposed such that the inner periphery of the magnet 108 faces the outer periphery of the stator 102 with a gap.

A drive current supply to the coil 103 causes a rotational driving force to act on the magnet 108, thereby rotating the hub 105, the magnet 108, and the yoke 109 with respect to the base 200, the stator 102, and the coil 103. This makes it possible to rotate the magnetic disks 11 mounted on the outer periphery of the first part 105a and the outer periphery of the second part 105b included in the hub 105. When the hub 105 is formed of a magnetic material, the yoke 109 may be omitted since the hub itself functions as a yoke.

In the spindle motor 100 illustrated in FIG. 2, a thrust bush 113 is disposed in such a manner as to close a lower end opening of the cylindrical sleeve 111 fixed to the bottom wall 201. A cylindrical thrust plate 112 is provided on the thrust bush 113 such that the inner periphery of the thrust plate 112 is in contact with the shaft 101. The thrust plate 112 receives a Z-directional thrust force occurring from the rotation of the spindle motor 100. The thrust bush 113 disperses the Z-directional force to aid the thrust plate 112 to receive the thrust force. The thrust bush 113 is generally made of a low friction material, thereby enabling smooth rotation and axial force control of the spindle motor 100.

The third part 105c of the hub 105 is a hub flange and functions as a holder for the magnetic disks 11. As illustrated in FIG. 2, the five magnetic disks 11 are mounted on the third part 105c via spacers 110. In addition, the number of magnetic disks 11 to be mounted may be five or more depending on an intended use. The uppermost one of the magnetic disks 11 is fixed to the hub 105 using a clamp 106 attached to the upper surface of the hub 105 with a screw 107.

In the spindle motor 100 according to the first embodiment, the third part 105c serving as the hub flange has a first thickness h1 of 1.89 mm in the Z direction. A second thickness h2 corresponds to the distance from a base surface 204 facing the third part 105c to the outer side of the bottom wall 201 and is set to 4.3 mm. A value obtained by dividing the second thickness h2 by the first thickness h1 (h2/h1) is found as 2.28.

The HDD of the present embodiment including the shaft-rotating spindle motor 100 and the five or more magnetic disks 11 requires a sufficiently large second thickness h2 to exert sufficient impact resistance. A smaller second thickness h2 may result in increasing the amount of elastic deformation of the bottom wall 201 upon receipt of impact. This may lead to damaging functional components such as the spindle motor 100 and the head actuator 15. However, the HDD according to the present embodiment has the device height H of 26.1 mm at a maximum according to the standards, and there is a limitation on the space along the height. Moreover, in view of preventing an increase in deformation amount of the magnetic disks, it is necessary to ensure the dimension of the first thickness h1 of the third part 105c being the hub flange to some extent. In this regard, it is important to adjust the dimensions of the first thickness h1 and the second thickness h2 to ensure design reliability in the HDD having five or more magnetic disks 11 mounted thereon.

Effects of First Embodiment

A larger number of magnetic disks 11 generally means a larger mounting area of the magnetic disks 11 along the height. This may make it difficult to ensure a sufficient dimension of the second thickness h2 in view of obtaining impact resistance. In such a case, the shaft-fixed spindle motor is frequently adopted. The shaft-fixed spindle motor has a structure that the shaft upper and lower parts are both stationary to allow the rotational part to rotate around the stationary shaft. Such a shaft-fixed spindle motor is generally excellent in impact resistance and vibration characteristics since the shaft is less likely to directly receive external impact and vibration.

However, the shaft-fixed spindle motor includes a larger number of components than the shaft-rotating spindle motor 100, resulting in a complicated mechanism. The present embodiment adopts the shaft-rotating spindle motor 100 which includes a smaller number of components, leading to decreasing the number of assembling man-hours than the shaft-fixed spindle motor. Because of this, cost advantages of about 30% can be expected. This can further eliminate the necessity to selectively use the shaft-fixed type or the shaft-rotating type depending on the number of magnetic disks to mount, leading to reducing a development period or labor costs through parts sharing. As such, it is possible to implement an HDD including a larger number of magnetic disks at lower cost by adopting the structure of the present embodiment.

Figure 3:
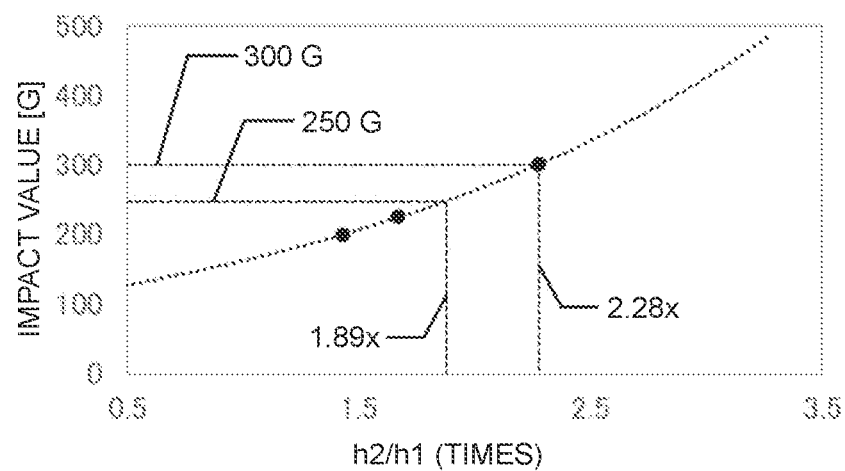
FIG. 3 is an exemplary graph showing a relationship between h2/h1 and impact resistance.

FIG. 3 is an exemplary graph showing a relationship between h2/h1 and impact resistance. A disk device including five magnetic disks 11 was subject to an impact resistance test under three different h2/h1 conditions. The horizontal axis represents h2/h1, and the vertical axis represents impact values. The graph represents an approximate curve obtained by plotting impact values at which the HDD was destroyed. HDDs distributed in the market are required to have a general product standard value of about 250 G. It can be seen from FIG. 3 that h2/h1 is 1.89 times at the product standard value of 250 G. Consequently, the product standard value of 250 G can be achieved by setting the value of h2/h1 to 1.89 or more.

The spindle motor 100 according to the first embodiment has the first thickness h1 of 1.89 mm and the second thickness h2 of 4.3 mm, thus, h2/h1 is found as 2.28. As such, the spindle motor 100 have specifications to be able to exert sufficient impact resistance with a margin of 50 G with respect to the product standard value of 250 G.

Note that, in order to achieve the general product standard value of 250 G, the value of h2/h1 can be greater than or equal to 1.89 and is not limited to 2.28. It is, however, preferable that h2/h1 be greater than or equal to 2.28 in view of impact resistance of 300 G or more as a safer product standard value.

Figure 4:
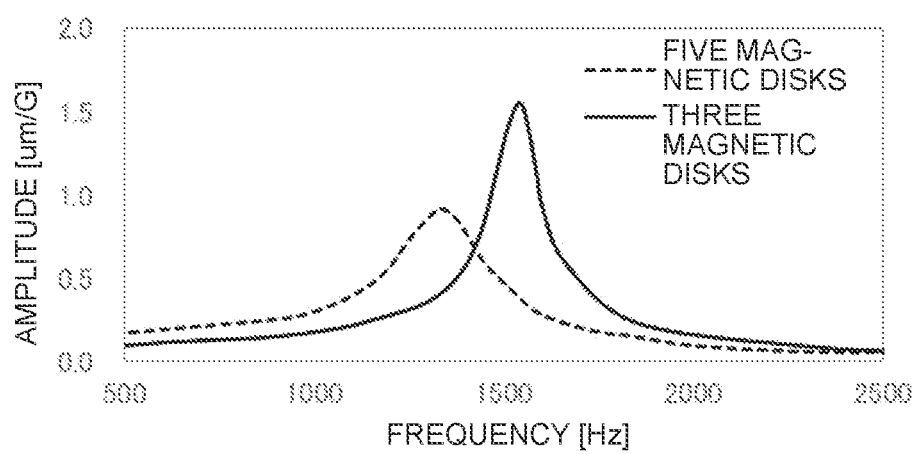
FIG. 4 is an exemplary diagram showing a simulation result of vibration characteristics.

FIG. 4 is an exemplary graph illustrating an example of vibration-characteristics simulation results with respect to HDDs incorporating three and five magnetic disks 11, respectively. In FIG. 4, the broken line indicates a simulation result of the HDD of the first embodiment including five magnetic disks 11, and the solid line indicates a simulation result of another HDD including three magnetic disks 11. Normally, there may be a concern that an increased number of magnetic disks 11 to be mounted results in deterioration of vibration characteristics. This is because a rotation balance issue arises from the mass distribution of the structure deviating from its axis and uneven distribution of the rotation speed. In this regard, it is possible to abate influences of the rotation imbalance to achieve stable vibration characteristics by ensuring a sufficient dimension of the second thickness h2. As illustrated in FIG. 4, the HDD including the five magnetic disks 11 according to the present embodiment exhibits a lower peak amplitude at acceleration of 1 G ($9.8 \text{ m/s}^2$) than the conventional HDD including three magnetic disks 11. It is thus demonstrated that the HDD of the present embodiment incorporating an increased number of magnetic disks can exert stable vibration characteristics.

In addition, in the case of the HDD including five or more magnetic disks 11, the magnetic disks 11 are arranged with narrower intervals, therefore, it is also important to evaluate the deformation amount of the magnetic disks 11 during the operation of the HDD. In this regard, the deformation amount of the magnetic disks 11 during the operation of the HDD according to the first embodiment was measured. As a result, it is confirmed that the measured deformation amount is comparable to the deformation amount of the magnetic disks 11 in the conventional HDD and have no influences on data writing and reading.

As described above in detail, the HDD according to the first embodiment can attain sufficient impact resistance by setting the second thickness h2 and the first thickness h1 in such a manner that the value obtained by dividing the second thickness h2 by the first thickness h1 is greater than or equal to 1.89 times. Furthermore, the evaluation results demonstrate that such setting has no influence on the vibration characteristics and the deformation amount of the magnetic disks. Thereby, the standard 3.5 inch HDD including the housing 10 of height (thickness) H of 26.1 mm at a maximum and the shaft-rotating spindle motor 100 can have five or more magnetic disks 11 mounted thereon, achieving a larger capacity.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
    a base;
    five or more magnetic disks;
    a head actuator; and
    a spindle motor, wherein
    the base includes:
        a bottom wall having a second thickness; and
        a side wall being erected along a periphery of the bottom wall,
    the base accommodates the five or more magnetic disks,
    the head actuator includes a magnetic head supported in a freely movable manner,
    the spindle motor includes:
        a sleeve with a first hole, fixed to the bottom wall;
        a shaft inserted in the first hole in a freely rotatable state; and
        a hub that is freely rotatable together with the shaft, the hub including:
            a first part with a shaft opening into which an upper end of the shaft is inserted;
            a second part extending from an outer periphery of a lowermost surface of the first part in a first direction being from the magnetic disks toward the bottom wall; and
            a third part having a first thickness, facing the bottom wall, and extending from a lowermost surface of the second part in a second direction orthogonal to the first direction
    the first thickness of the third part is set such that a value obtained by dividing the second thickness by the first thickness is greater than or equal to 1.89.

2. The magnetic disk device according to claim 1, wherein the value obtained by dividing the second thickness by the first thickness is greater than or equal to 2.28.

3. The magnetic disk device according to claim 1, wherein the first thickness and the second thickness are thicknesses in the first direction, and the third part is located between the bottom wall and the magnetic disks in the first direction.

4. The magnetic disk device according to claim 1, wherein the first thickness is greater than or equal to 1.89 mm.

5. The magnetic disk device according to claim 1, further comprising:
- a top cover fixed to the side wall, wherein
- a height from a lowermost surface of the bottom wall to an uppermost surface of the top cover is set to less than or equal to 26.2 mm.

6. The magnetic disk device according to claim 1, wherein the base is further provided with a second hole, and the sleeve is secured in the second hole.

7. The magnetic disk device according to claim 6, further comprising:
- a cylindrical unit in the second hole, the cylindrical unit extending in the first direction, wherein
- the cylindrical unit has a coil on a stator fixed to an outer periphery of the cylindrical unit.

8. The magnetic disk device according to claim 7, further comprising:
- a magnet disposed between the second part and the coil; and
- a yoke disposed between the magnet and the second part.

9. The magnetic disk device according to claim 1, further comprising:
- a clamp disposed on an upper surface of the hub, wherein
- the magnetic disks are disposed between the third part and the clamp via spacers.

\* \* \* \* \*